United States Patent
Kim

(10) Patent No.: US 11,320,018 B2
(45) Date of Patent: May 3, 2022

(54) FLUID-SEALED ENGINE MOUNT OF VEHICLE

(71) Applicants: Hyundai Motor Company, Seoul (KR); Kia Motors Corporation, Seoul (KR)

(72) Inventor: Seung Won Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 112 days.

(21) Appl. No.: 16/596,169

(22) Filed: Oct. 8, 2019

(65) Prior Publication Data

US 2020/0325955 A1 Oct. 15, 2020

(30) Foreign Application Priority Data

Apr. 11, 2019 (KR) .......................... 10-2019-0042246

(51) Int. Cl.
*F16F 9/512* (2006.01)
*B60G 17/027* (2006.01)
*B60K 5/12* (2006.01)

(52) U.S. Cl.
CPC ............ *F16F 9/512* (2013.01); *B60G 17/027* (2013.01); *B60K 5/1283* (2013.01); *B60G 2204/18* (2013.01)

(58) Field of Classification Search
CPC .... B64C 25/60; B60G 17/027; B60G 17/033; B60G 2204/18; B60K 5/1283; B60K 5/1233; B60K 5/12; B60K 5/1208; B60K 5/1291; B64F 2700/6242

USPC ........................................................ 267/64.15
See application file for complete search history.

(56) References Cited

U.S. PATENT DOCUMENTS

| | | | | |
|---|---|---|---|---|
| 6,655,667 | B1 * | 12/2003 | Hamaekers | F16F 13/105 267/140.13 |
| 6,799,753 | B2 * | 10/2004 | Okanaka | F16F 13/10 267/140.11 |
| 2004/0119214 | A1 * | 6/2004 | Okanaka | F16F 13/108 267/140.11 |
| 2015/0328969 | A1 * | 11/2015 | Hirano | F16F 9/10 267/122 |
| 2019/0017568 | A1 * | 1/2019 | Kim | F16F 13/107 |
| 2019/0063542 | A1 * | 2/2019 | Han | F16F 13/107 |

FOREIGN PATENT DOCUMENTS

| | | |
|---|---|---|
| JP | H06-328948 A | 11/1994 |
| JP | 3227904 B2 | 11/2001 |
| KR | 10-2007-0065022 A | 6/2007 |
| KR | 101251488 B1 | 4/2013 |

* cited by examiner

*Primary Examiner* — Robert A. Siconolfi
*Assistant Examiner* — San M Aung
(74) *Attorney, Agent, or Firm* — Mintz Levin Cohn Ferris Glovsky and Popeo, P.C.; Peter F. Corless

(57) ABSTRACT

A fluid-sealed engine mount includes a variable orifice whose cross-section is changed according to a magnitude of engine vibration, thereby keeping a damping performance substantially unchanged at a time of large displacement vibration of an engine as compared to a time of small displacement vibration of the engine.

12 Claims, 10 Drawing Sheets

FLUID-SEALED ENGINE MOUNT OF VEHICLE

CROSS-REFERENCE TO RELATED APPLICATION

This application claims under 35 U.S.C. § 119(a) the benefit of Korean Patent Application No. 10-2019-0042246 filed on Apr. 11, 2019, the entire contents of which are incorporated herein by reference.

BACKGROUND

(a) Technical Field

The present disclosure relates to a fluid-sealed engine mount, more particularly, to the fluid-sealed engine mount that controls behavior of an engine mounted on a vehicle body and insulates vibration.

(b) Description of the Related Art

Generally, an engine mount is used in a vehicle to control the behavior of an engine and to insulate vibration. A conventional engine mount applies a fluid-sealed engine mount in order to insulate engine vibration appearing in a wide frequency band.

In the conventional fluid-sealed engine mount, a flow path for fluid movement is disposed between an upper liquid chamber and a lower liquid chamber, in addition to an insulator for vibration insulation, and the vibration of the engine is absorbed by the insulator and the fluid.

Since across-sectional area and a length of the flow path is set in the conventional fluid-sealed engine mount, a large difference in damping force and frequency may occur for each vibration magnitude of the engine. Generally, in the conventional fluid-sealed engine mount, as the magnitude of the vibration increases, the damping force reduces and the frequency increases.

The conventional fluid-sealed engine mount can attenuate vertical vibration of the engine in a predetermined frequency range to control the engine vibration during traveling, and the damping performance varies according to the magnitude of vibration input to the engine mount. Particularly, there is a problem in that in the conventional fluid-sealed engine mount, the damping performance with respect to large displacement behavior (movement) in which the engine moves in the vertical direction of the vehicle is relatively lower than the damping performance with respect to a bottom displacement behavior of the engine. Specifically, in the fluid-sealed engine mount, the pressure acting on the fluid sealed inside the engine mount at the time of the large displacement behavior of the engine is increased as compared with small displacement behavior thereof, and therefore, since the flow rate of the fluid increases, frictional resistance caused by the flow of the fluid in the flow path (orifice) in which the fluid flows becomes large. There is a problem in that in the fluid-sealed engine mount, the flow of the fluid is reduced as the frictional resistance increases, and as a result, the damping force for engine vibration is reduced.

That is, the conventional fluid-sealed engine mount requires a relatively large damping force at the time of the large displacement behavior of the engine as compared to the small displacement behavior of the engine, and there is a problem in that the damping force at the large displacement behavior of the engine is further reduced as compared to the small displacement behavior of the engine.

The above information disclosed in this Background section is only for enhancement of understanding of the background of the disclosure and Therefore it can contain information that does not form the prior art that is already known in this country to a person of ordinary skill in the art.

SUMMARY

The present disclosure provides a fluid-sealed engine mount having a variable orifice whose cross-section is changed according to a magnitude of engine vibration, thereby keeping a damping performance substantially unchanged at a time of large displacement vibration of an engine as compared to a time of small displacement vibration of the engine.

Therefore, the present disclosure provides a fluid-sealed engine mount including an insulator formed at the lower portion of a mount core connected with an engine to insulate vibration by the movement according to the engine vibration; a membrane unit disposed under the insulator to separate an upper liquid chamber formed inside the insulator from a lower liquid chamber formed under the upper liquid chamber; a contact rib provided at the lower portion of the insulator to be disposed in a state contacting the surface of the membrane unit, and having a contact width contacting the surface of the membrane unit changed according to the movement of the insulator; and a variable orifice formed at the lower portion of the insulator to enable the fluid flow between the upper liquid chamber and the lower liquid chamber, and having a cross-section area changed according to the contact width of the contact rib by being disposed adjacent to the contact rib.

The engine mount has the following characteristics.

As the insulator is pressed downward by the engine vibration, the contact width of the contact rib contacting the surface of the membrane unit can be increased. As the insulator is pulled upward by the engine vibration, the contact width of the contact rib contacting the surface of the membrane unit can be reduced.

A bending part contacting the surface of the membrane unit in a state bent toward the upper liquid chamber can be provided at the lower end portion of the contact rib. The lower portion of the insulator can be bonded to the inner circumferential surface of an outer pipe unit that is fixed to a vehicle body through a mount bracket. A fixed rib disposed at the outside of the contact rib to surround the variable orifice can be provided at the lower portion of the insulator, and the fixed rib can be fixed to the inner circumferential surface of the outer pipe unit in a state stacked on the surface of the membrane unit. A first fluid flow hole for fluid flow between the upper liquid chamber and the variable orifice can be formed at one side of the contact rib. A second fluid flow hole for fluid flow between the lower liquid chamber and the variable orifice can be provided at one side of the membrane unit. The variable orifice is formed in an annular shape along the circumferential direction of the insulator, and maintained at a certain length without changing according to the movement of the insulator.

The membrane unit can be composed of a membrane plate press-fitted into the outer pipe unit; and a membrane disposed at the central portion of the membrane plate to be elastically deformed by the pressure difference between the upper liquid chamber and the lower liquid chamber. The outer pipe unit can be composed of a first outer pipe provided with a support end formed by stacking the inner circumferential surface contacted with the lower portion of the insulator and the upper surface of the membrane plate; and a second outer pipe having the first outer pipe and the membrane plate press-fitted therein to be vertically disposed.

The mount bracket can include a casing part to which the outer pipe unit is press-fitted and fixed, and the outer pipe unit can enter the casing part until the upper end of the insulator contacts the inner surface of the casing part. The upper end of the insulator is lowered by the load due to the weight of the engine when the mount core is connected with the engine to be separated from the inner surface of the casing part.

In the fluid-sealed engine mount according to the present disclosure, it is possible to increase the damping force at the time of the large displacement vibration of the engine as compared to at the time of the small displacement vibration of the engine by changing the cross-section of the variable orifice according to the magnitude of engine vibration, thereby securing the damping rate of the same level with respect to the small displacement vibration and the large displacement vibration of the engine.

The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given herein below by way of illustration only, and thus are not limitative of the present disclosure, and wherein.

Figure 1:
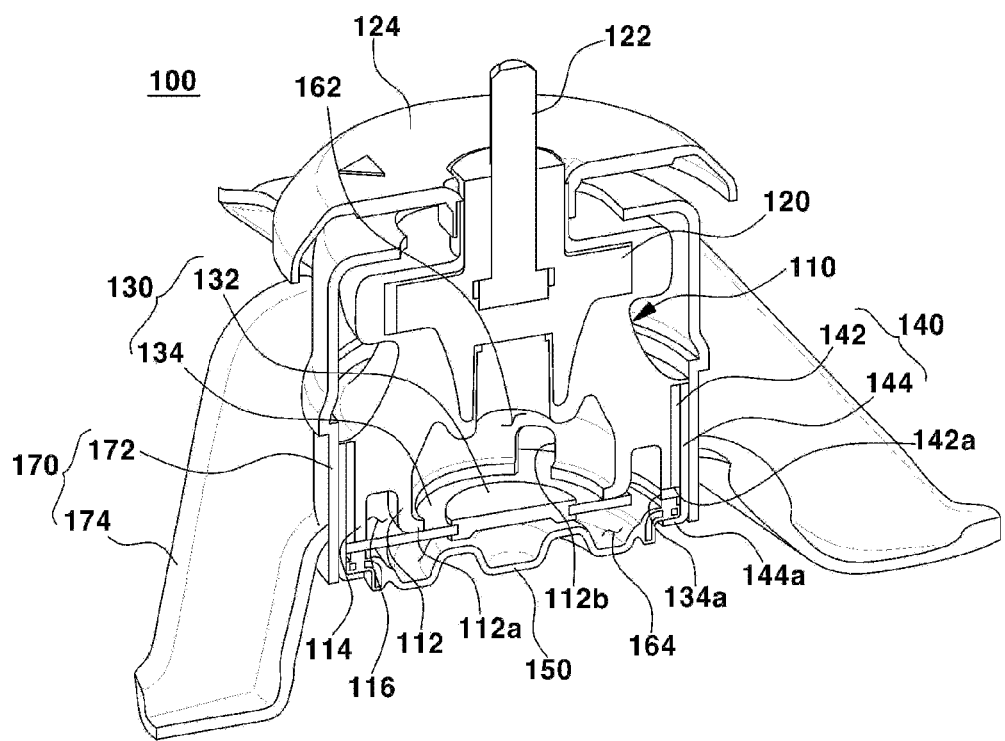
FIG. 1 is a perspective diagram illustrating a fluid-sealed engine mount cut in half according to the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the drawings, reference numbers refer to the same or equivalent sections of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN). A fluid-sealed engine mount requires a damping force greater than when the small displacement behavior of an engine occurs in order to keep the damping performance (damping rate) of the engine mount regardless of the magnitude (amplitude) of engine vibration, when a relatively large amplitude vibration is input due to occurrence of the large displacement behavior (movement) of the engine.

The damping force w of a fluid-sealed engine mount can be calculated as in the following Equation 1.

$$\omega^2 = (2\pi f)^2 = (a \times Cv)/(\rho \times l) \qquad \text{Equation 1}$$

Herein, ω refers to a damping force of the fluid-sealed engine mount, f refers to a frequency of input vibration, a refers to a cross-sectional area of an orifice for moving (an upper liquid chamber↔a lower liquid chamber) fluid sealed in the engine mount, $C_v$ refers to volume stiffness, ρ refers to the density of fluid, and l refers to the length of the orifice.

As can be seen from Equation 1, the damping force ω of the fluid-sealed engine mount is proportional to the cross-sectional area a of the orifice and inversely proportional to the length l of the orifice.

In particular, the fluid-sealed engine mount according to the present disclosure is configured to include a variable orifice whose cross-sectional area is changed according to a magnitude of engine vibration. Since the fluid-sealed engine mount applies the variable orifice, it is possible to increase the damping force at a time of a large displacement behavior as compared to a time of a small displacement behavior of the engine, and therefore, it is possible to keep the damping performance at substantially the same level as the time of the small displacement vibration of the engine.

Hereinafter, an engine mount of the present disclosure will be described with reference to the accompanying drawings.

Figure 2:
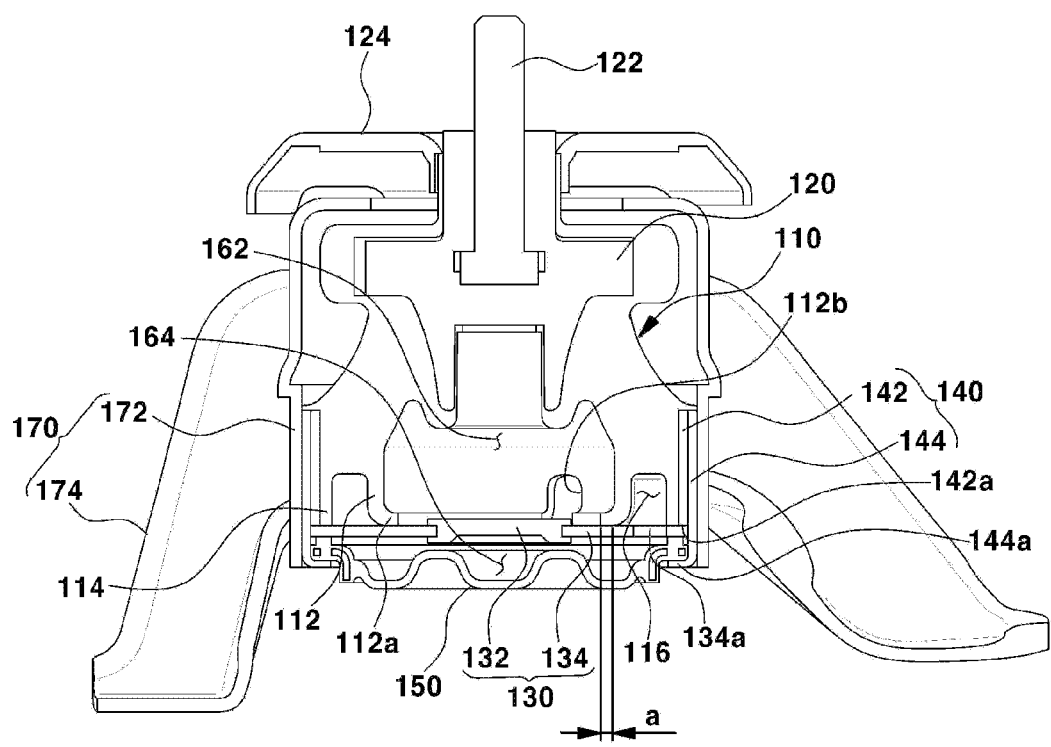
FIG. 2 is a front diagram illustrating by cutting the engine mount according to the present disclosure.

As illustrated in FIGS. 1 and 2, a fluid-sealed engine mount 100 of the present disclosure is configured to include an insulator 110, a membrane unit 130, a variable orifice 116, etc.

The insulator 110 is integrally provided in a mount core 120 connected to the engine, is made of rubber having strong elasticity, and can be vulcanized and molded under the mount core 120. The mount core 120 can be coupled to the engine through a bolt member 122 and move integrally with the engine. The insulator 110 is connected to the engine by the mount core 120 and moves according to the engine vibration inputted through the mount core 120. The insulator 110 insulates the vibration while moving according to the vibration of the engine. The engine vibration can occur in the vertical direction of the vehicle.

The upper portion of the insulator 110 can be formed to be bonded to the mount core 120 to surround the mount core 120, when the insulator 110 is molded. The lower portion of the insulator 110 can be formed to surround an upper liquid chamber 162 in which the fluid is sealed. In addition, a contact rib 112, a fixed rib 114, and the variable orifice 116 can be formed under the insulator 110.

The contact rib 112 and the fixed rib 114 are formed to surround the variable orifice 116. The contact rib 112 can be disposed inside the variable orifice 116 and the fixed rib 114 can be disposed outside the variable orifice 116. The contact rib 112 and the fixed rib 114 can be disposed in a state stacked on the upper surface of the membrane unit 130. The lower surface of the fixed rib 114 can be stacked in a state contacting the upper surface of the membrane unit 130.

The lower end portion of the contact rib 112 can be stacked on the upper surface of the membrane unit 130 in a state bent toward the upper liquid chamber 162. The lower end portion of the contact rib 112 slidably contacts the surface of the membrane unit 130. When the engine vibration is input to the mount core 120, the contact rib 112 vertically moves by interlocking with the behavior of the insulator 110. The movement amount and the movement direction of the contact rib 112 can be changed according to the magnitude and the direction of vibration input from the engine. The contact width (the contact amount) contacting the surface of the membrane unit 130 can be changed according to the movement amount and the movement direction thereof. The contact rib 112 can be further bent or unfolded according to the magnitude and the direction of the input vibration. The initial contact amount (i.e., the initial contact width) (see a in FIG. 2) of the contact rib 112 that contacts the surface of the membrane unit 130 before the vibration is transferred to the mount core 120 can be referred to as a first contact value, and the first contact value can be set to a certain value. The contact width of the contact rib 112 that contacts the surface of the membrane unit 130 is greater than the first contact value, when the engine vibration is input to the mount core 120 in the direction of pressing and compressing the insulator 110 and the contact width of the contact rib 112 can be increased in proportion to the magnitude of the engine vibration. The first contact value can be set based on a state where the upper end of the insulator 11 has been separated from the inner surface of a casing part 172 of a mount bracket 170 by the load according to the weight of the engine connected to the mount core 120. The insulator 110 can be inserted into the casing part 172 until the upper end of the insulator 110 contacts the inner surface of the casing part 172, in an assembled state before the mount core 120 is connected with the engine (see FIGS. 6B and 6C). The upper end of the insulator 110 is separated at a certain interval from the inner surface of the casing part 172 by the load of the engine, in an assembled state where the mount core 120 has been connected with the engine (see FIG. 2). When the engine mount 100 is mounted between the vehicle body and the engine, the load according to the weight of the engine connected to the mount core 120 acts on the insulator 110.

The contact rib 112 is disposed between the upper liquid chamber 162 and the variable orifice 116, and formed to be deformed according to the magnitude of vibration input to the mount core 120. The contact rib 112 is disposed at a position to surround the lower portion of the upper liquid chamber 162 under the insulator 110, is disposed outside the upper liquid chamber 162, and inside the variable orifice 116. When the insulator 110 vertically moves by the vibration, the contact rib 112 also moves vertically. As the contact rib 112 moves downward, the contact rib 112 can be bent more and more, and as the contact rib 112 moves upward, the contact rib 112 can be gradually unfolded and restored.

Specifically, the contact rib 112 can be integrally molded with the insulator 110 to be disposed under the insulator 110. The contact rib 112 can be molded by bending the lower portion thereof toward the center of the membrane unit 130. The bent lower portion of the contact rib 112 can be referred to as a bending part 112a. The bending part 112a can be deformed according to the behavior of the contact rib 112.

The fixed rib 114 is supported by an outer pipe unit 140 disposed outside the lower portion of the insulator 110 and the membrane unit 130 disposed under the insulator 110. The fixed rib 114 can be supported by stacking the lower surface of the fixed rib 114 on the membrane unit 130, in a state where the outer circumferential surface there has been bonded to the inner circumferential surface of the outer pipe unit 140. This fixed rib 114 can be maintained in its original shape by the outer pipe unit 140 and the membrane unit 130 even when the insulator 110 and the contact rib 112 are deformed by the input vibration. That is, the fixed rib 114 can be maintained in a constant shape regardless of whether the insulator 110 and the contact rib 112 are deformed.

Figure 3:
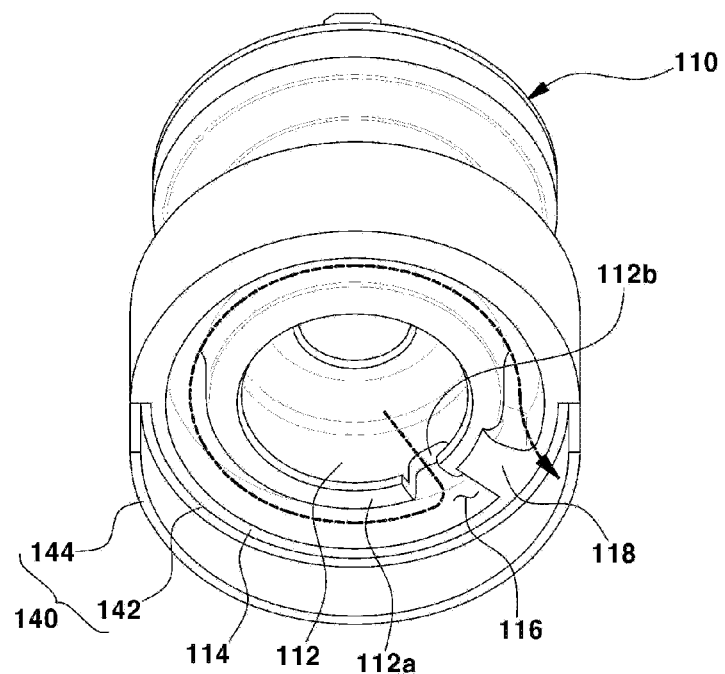
FIG. 3 is a bottom perspective diagram illustrating an insulator of the engine mount according to the present disclosure.

The variable orifice 116 is a flow path for fluid flow and movement between the upper liquid chamber 162 and a lower liquid chamber 164. As illustrated in FIGS. 1 to 3, the variable orifice 116 is disposed between the contact rib 112 and the fixed rib 114. The variable orifice 116 can be provided at the lower portion of the insulator 110 with the lower end thereof opened. The opened lower end of the variable orifice 116 can be sealed by the membrane unit 130 disposed under the insulator 110. That is, the variable orifice 116 can be disposed between the insulator 110 and the membrane unit 130.

The cross-sectional area of the variable orifice 116 can be changed according to the movement of the insulator 110. This is because when the upper portion of the insulator 110 moving with the mount core 120 is vertically moved, the contact rib 112 formed at the lower portion of the insulator 110 also move vertically and is deformed. As the variable orifice 116 is disposed adjacent to the contact rib 112, the cross-sectional area for fluid flow can be changed by deformation of the contact rib 112. The contact rib 112 slides on the surface of the membrane unit 130 when being deformed by interlocking with the behavior of the insulator 110. The variable orifice 116 can be formed in an annular shape along the circumferential direction of the membrane unit 130 and the circumferential direction of the insulator 110. The circumferential length of the variable orifice 116 is constantly maintained at all times regardless of whether the insulator 110 is moved.

Meanwhile, the membrane unit 130 can be configured to separate the upper liquid chamber 162 formed inside the lower portion of the insulator 110 and the lower liquid chamber 164 disposed under the upper liquid chamber 162. The membrane unit 130 can include an outer membrane plate 134 and an inner membrane 132. The membrane plate 134 can be formed in a flat plate shape having the central portion opened. The membrane 132 can be bonded to the central portion of the membrane plate 134 to seal the central portion of the membrane plate 134. The membrane 132 can be integrally fixed by being formed and vulcanized at the central portion of the membrane plate 134. The membrane 132 can be elastically deformed by a fluid pressure difference between the upper liquid chamber 162 and the lower liquid chamber 164, and such deformation can partially insulate the engine vibration.

The membrane plate 134 can be press-fitted into and fixed to the outer pipe unit 140. The membrane plate 134 is disposed between the upper liquid chamber 162 and the lower liquid chamber 164 in a state fixed to the inside of the outer pipe unit 140. A second fluid flow hole 134a for fluid flow between the variable orifice 116 and the lower liquid chamber 164 can be formed at one side of the membrane plate 134. A first fluid flow hole 112b can be formed at one side of the contact rib 112. The first fluid flow hole 112b enables the fluid flow between the upper liquid chamber 162 and the variable orifice 116. The first fluid flow hole 112b and the second fluid flow hole 134a can be spaced at a certain interval apart from each other with respect to the circumferential direction of the variable orifice 116. A block part 118 for blocking the fluid flow can be provided at a position on the variable orifice 116 corresponding between the first fluid flow hole 112b and the second fluid flow hole 134a. The fluid moving between the upper liquid chamber 162 and the lower liquid chamber 164 flows along the circumferential direction of the variable orifice 116 due to the block part 118, when passing through between the first fluid flow hole 112b and the second fluid flow hole 134a.

The lower liquid chamber 164 can be sealed by a diaphragm 150 disposed under the membrane plate 134. The diaphragm 150 can be assembled and fixed between the membrane plate 134 and the outer pipe unit 140. The diaphragm 150 can be elastically deformed to support the sealed state of the lower liquid chamber 164 when fluid movement occurs between the upper liquid chamber 162 and the lower liquid chamber 164.

The outer pipe unit 140 can be composed of an inner first outer pipe 142 and an outer second outer pipe 144. The first outer pipe 142 can be press-fitted into and fixed to the second outer pipe 144. The first outer pipe 142 can be formed to have the vertical length (the vertical height) shorter than the second outer pipe 144 by a certain length. Therefore, the lower end (or the lower surface) of the first outer pipe 142 supports the membrane plate 134 that is press-fitted into the second outer pipe 144 and can become a support end 142a for fixing the position of the membrane plate 134. The membrane plate 134 can be stacked on the support end 142a to be disposed under the first outer pipe 142. Then, a curling part 144a for supporting the diaphragm 150 can be provided at the lower end of the second outer pipe 144. The inner circumferential surface of the first outer pipe 142 can be bonded to the lower portion of the insulator 110.

Herein, an assembly procedure of the fluid-sealed engine mount configured as described above will be described with reference to FIGS. 4 to 6C.

Figure 4:
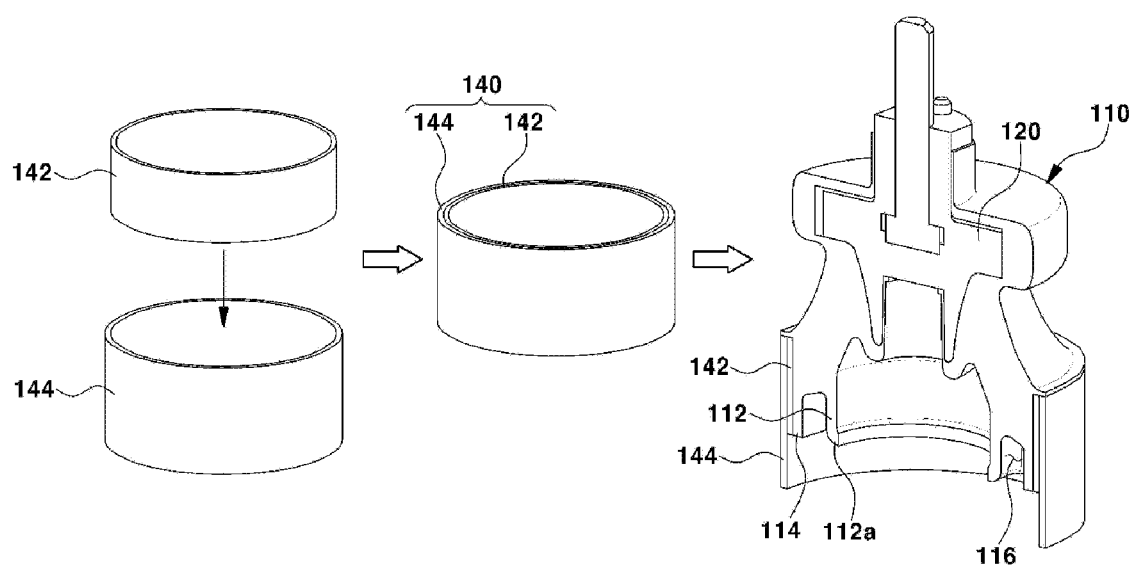
FIGS. 4 to 6C are diagrams illustrating an assembly procedure of the engine mount according to the present disclosure.

As illustrated in FIG. 4, the first outer pipe 142 is first press-fitted into the second outer pipe 144 to constitute the outer pipe unit 140. Next, the mount core 120 and the outer pipe unit 140 are set in the mold for molding the insulator 110, and the resin for insulator is injected into the cavity for insulator of the mold to mold the insulator 110. The bending part 112a of the contact rib 112 is formed in a state that has been slightly bent toward the upper liquid chamber 162 at the time of molding the insulator 110, but the insulator 110 including the contact rib 112 is molded with an elastic material such as rubber, and therefore, the contact rib 112 is elastically deformed, such that the insulator 110 can be detached from the mold without the locking of the contact rib 112.

Figure 5A:
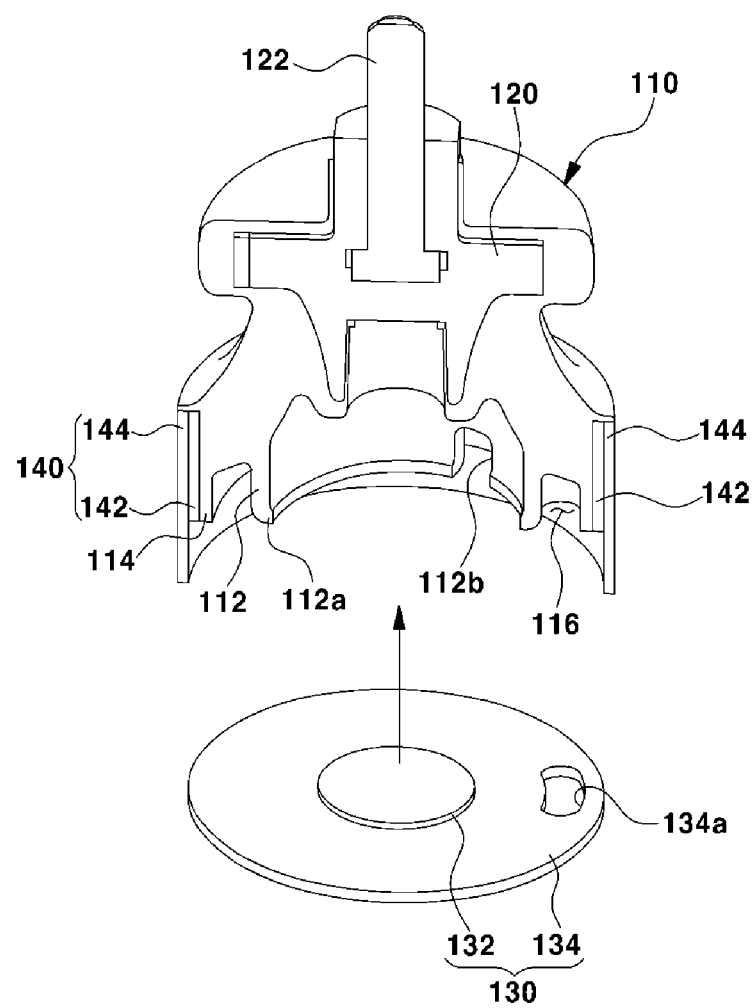
Figure 5B:
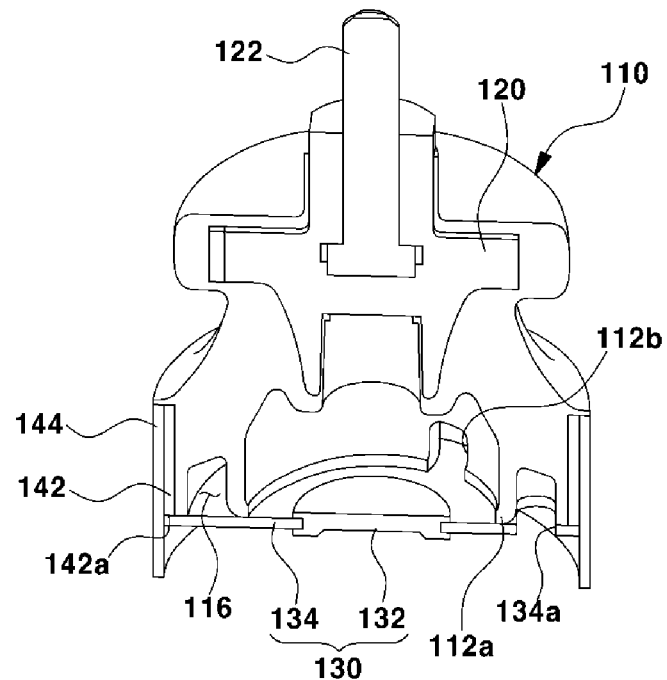

Then, as illustrated in FIGS. 5A and 5B, the membrane unit 130 is press-fitted into the outer pipe unit 140. The membrane unit 130 is press-fitted into the second outer pipe 144 until the surface of the membrane plate 134 is in closely contact with the support end 142a of the first outer pipe. At this time, the contact rib 112 and the fixed rib 114 facing the upper surface of the membrane plate 134 are stacked on and contact the upper surface of the membrane plate 134.

Figure 5C:
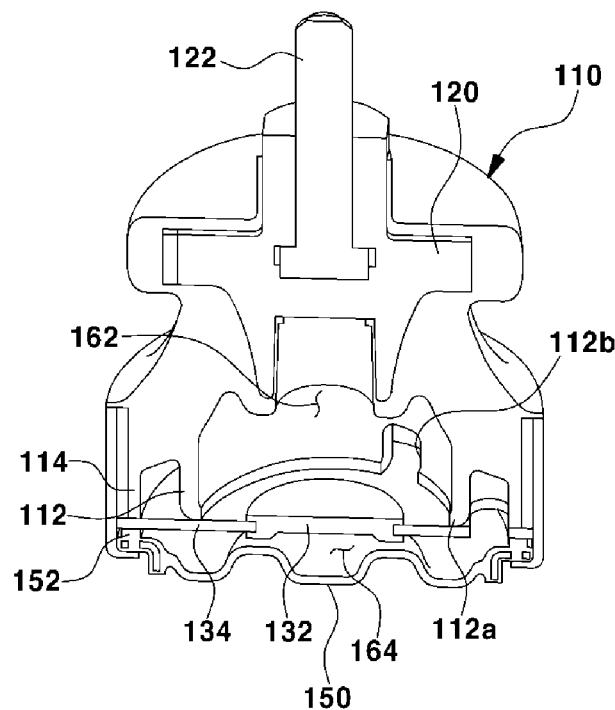

Then, as illustrated in FIG. 5C, the diaphragm 150 is stacked under the membrane plate 134, and the lower end portion of the second outer pipe 144 is curled toward the diaphragm 150. The curled end portion (i.e., the curling portion) of the second outer pipe 144 is supported so that a sealing part 152 of the diaphragm 150 is in close contact with the lower surface of the membrane plate 134. The sealing part 152 can be formed to be protruded from the edge of the diaphragm 150, and can be formed to extend along the circumferential direction of the diaphragm 150.

Figure 6A:
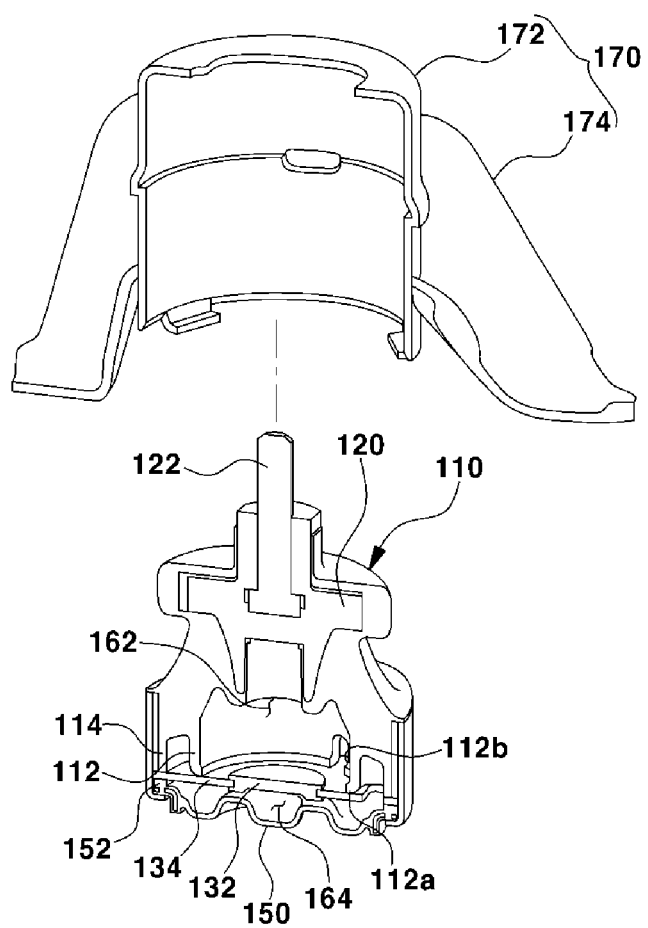
Figure 6B:
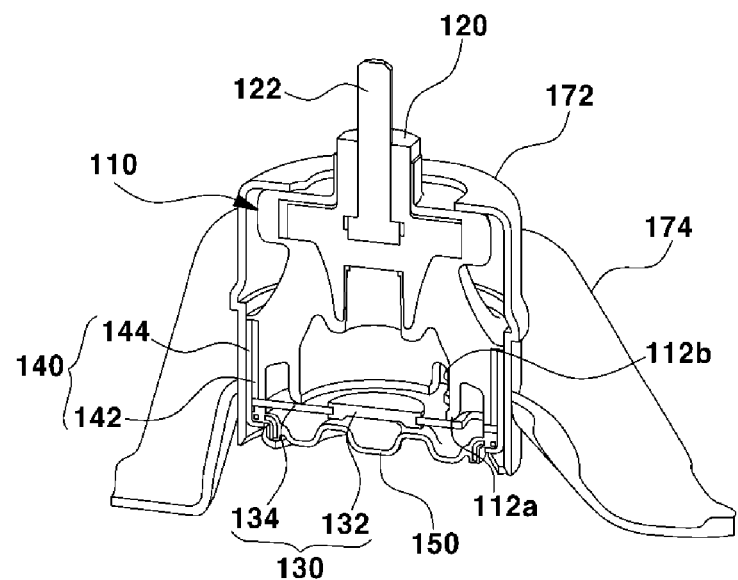
Figure 6C:
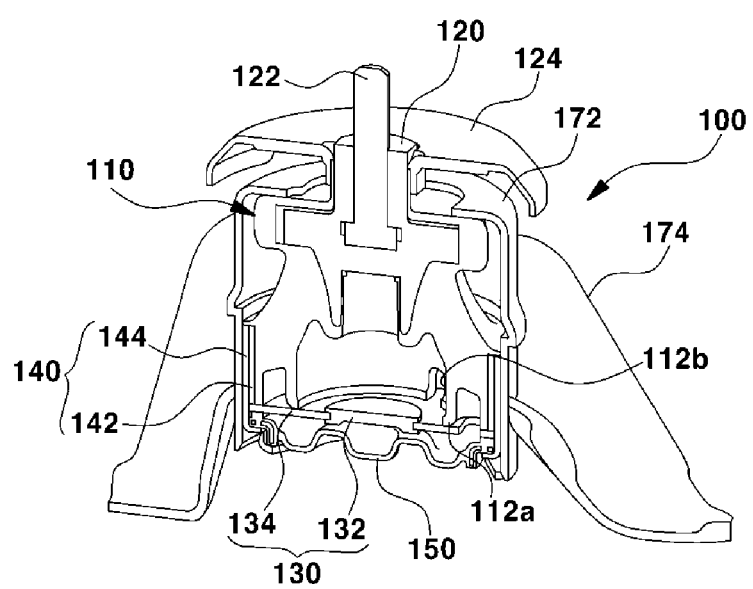

Subsequently, as illustrated in FIGS. 6A and 6B, the outer pipe unit 140 is press-fitted into and fixed to the casing part 172 of the mount bracket 170. The outer pipe unit 140 is pressurized and enters the casing part 172 until the upper surface of the insulator 110 contacts the upper inner surface of the casing part 172. At this time, as illustrated in FIG. 6C, the upper portion of the mount core 120 penetrates the upper end of the casing part 172 to be coupled with a dust cover 124. The dust cover 124 is disposed above the casing part 172 to cover the opened upper end of the casing part 172.

The mount bracket 170 includes a bracket part 174 formed integrally with the casing part 172, and the bracket part 174 can be mounted and fixed to the vehicle body or a chassis frame of the vehicle, etc.

Figure 7A:
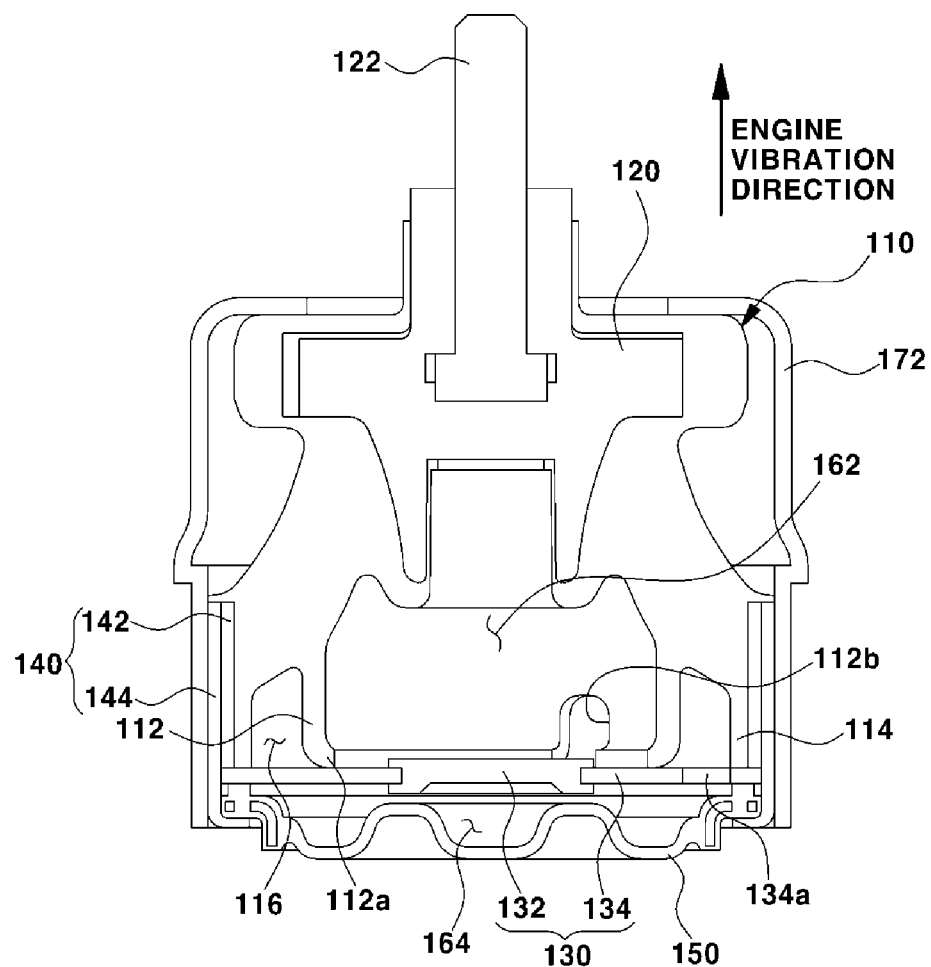
FIG. 7A is a diagram illustrating a state where the insulator of the engine mount according to the present disclosure has been maximally tensioned.
Figure 7B:
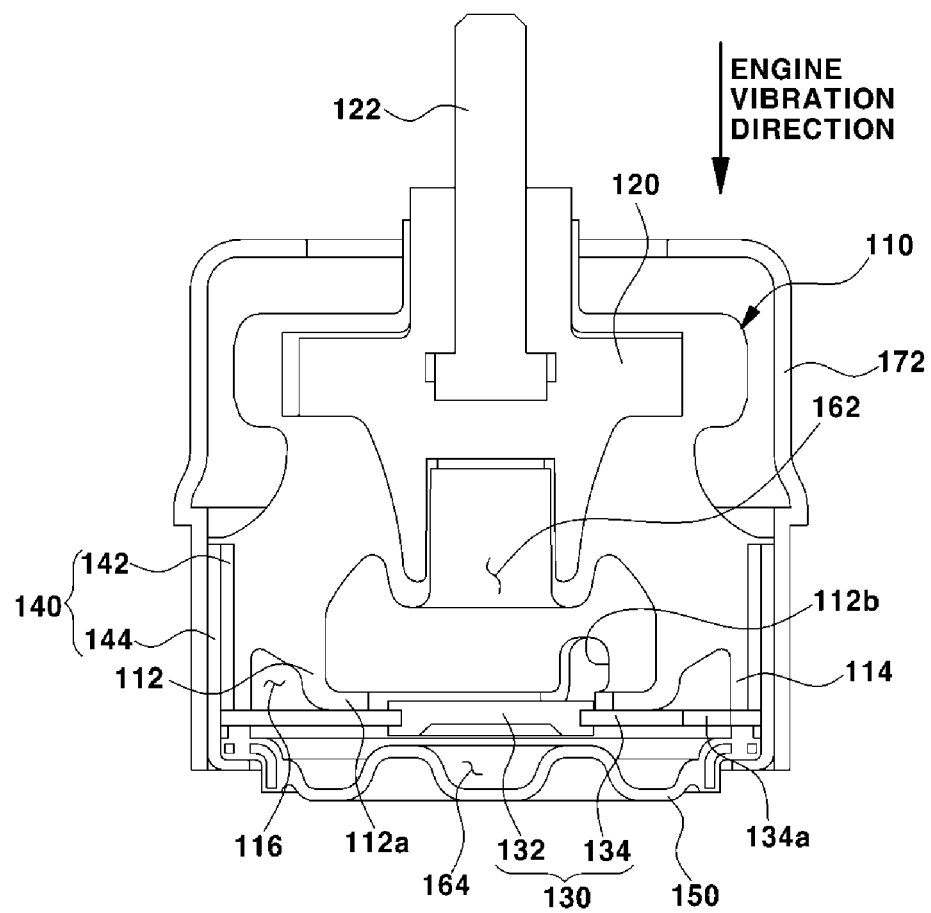
FIG. 7B is a diagram illustrating a state where the insulator of the engine mount according to the present disclosure has been maximally compressed.

As illustrated in FIGS. 7A and 7B, in the fluid-sealed engine mount 100 configured as described above, when the insulator 110 is vertically moved by the input vibration, the cross-sectional area of the variable orifice 116 surrounded by the contact rib 112 and the variable orifice 116 is changed. When the insulator 110 vibrates upward, the insulator 110 is pulled upward and tensioned, such that the cross-sectional area of the variable orifice 116 can be increased. When the insulator 110 vibrates downward, the insulator 110 is pressurized downward and compressed. When the insulator 110 is compressed, the contact rib 112 is pressed downward, such that the sectional area of the variable orifice 116 can be reduced. When the contact rib 112 is deformed by being pulled or pushed, the bent lower end portion (i.e., the bending part) of the contact rib 112, which is in contact with the surface of the membrane plate 134, is also deformed. When the contact rib 112 is pressed to the membrane unit 130 side, the lower end portion of the contact rib 112 can be further bent to enlarge the bending part 112*a*. When the contact rib 112 is pulled toward the mount core side, the lower end portion of the contact rib 112 can be unfolded to reduce the bending part 112*a*. That is, the length of the bending part 112*a* can be increased or reduced according to the deformation of the contact rib 112. The bending part 112*a* can slide on the surface of the membrane plate 134 when the contact rib 112 is deformed. When the bending part 112*a* slides to the membrane 132 side, the cross-sectional area of the variable orifice 116 can be reduced. When the bending part 112*a* slides to the outer pipe unit side, the cross-sectional area of the variable orifice 116 can be increased.

The cross-sectional area of the variable orifice 116 can be increased or reduced in proportion to the magnitude of vibration input to the mount core 120. Therefore, when the maximum vibration in the direction of pulling the insulator 110 upward is input to the mount core 120, the engine mount 100 has the maximum damping force. The damping force of the engine mount 100 can be reduced as the magnitude of the input vibration is reduced. The engine vibration is transferred to the vehicle body through the engine mount 100 when the engine moves downward. Therefore, when the engine mount 100 has the maximum damping force, the vibration input from the engine can be maximally insulated and minimized.

That is, the engine mount 100 can generate the damping force when the large displacement of the engine occurs greater than the damping force when the small displacement thereof. Therefore, when a relatively large vibration is input to the engine mount 100, the damping performance (the damping rate) of the same level as that in the case where small vibration is input to the engine mount 100 can be maintained.

That is, the engine mount 100 can secure the damping rate of the same level at all times with respect to the same frequency band regardless of the amplitude of the input vibration by the increase or the decrease in the damping force for each amplitude of the input vibration. In addition, the engine mount 100 can minimize the excitation caused by insufficient damping force when traveling on a road surface having large unevenness.

Figure 8:
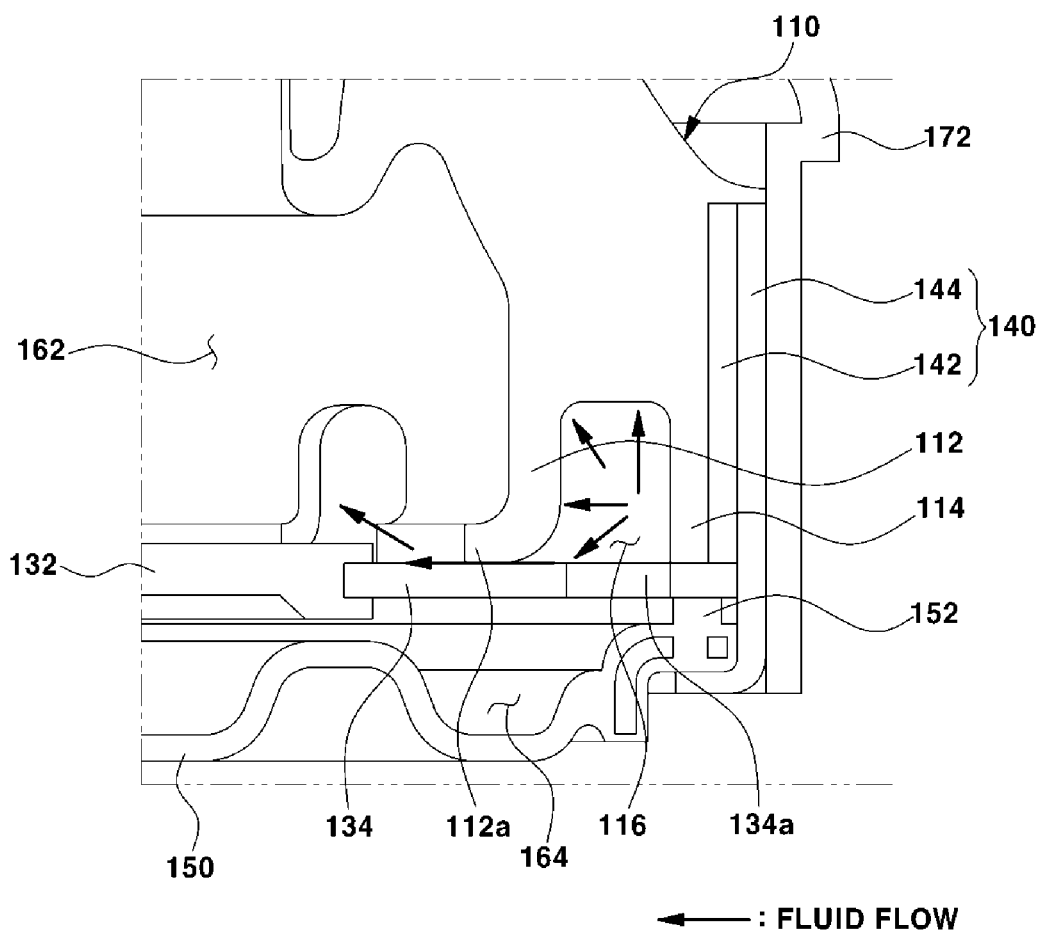
FIG. 8 is a diagram illustrating fluid flow that prevents the joint occurrence of the engine mount according to the present disclosure.

Meanwhile, as illustrated in FIG. 8, when the fluid pressure difference between the upper liquid chamber 162 and the lower liquid chamber 164 becomes a predetermined threshold pressure or more, a minute crack (gap) through which fluid minutely passes is formed between the contact rib 112 and the membrane unit 130, while the contact rib 112 is minutely lifted. The fluid pressure difference between the upper liquid chamber 162 and the lower liquid chamber 164 can be reduced to be smaller than the threshold pressure by the minute flow of the fluid. Therefore, when the fluid pressure difference is the threshold pressure or more, it is possible to prevent cavitation (joint) caused by the flow of fluid passing through the variable orifice 116. When the fluid pressure difference is smaller than the threshold pressure, the contact rib 112 is in close contact with the upper surface of the membrane unit 130 again and the flow of the fluid between the contact rib 112 and the membrane unit 130 does not occur.

In addition, since the structure for separating the upper liquid chamber 162 and the lower liquid chamber 164 is simplified as compared to from the conventional fluid-sealed engine mount, the vertical height of the engine mount 100 is reduced and the manufacturing cost is reduced. In addition, since the vertical height of the engine mount 100 is reduced, the input point rigidity can be enhanced.

As described above, although the embodiments of the present disclosure have been described in detail, the claims of the present disclosure is not limited to the above-described embodiments, and various modifications and improvements by those skilled in the art using the basic concept of the present disclosure defined in the appended claims can also be included the claims of the present disclosure.

What is claimed is:

1. A fluid-sealed engine mount of a vehicle, comprising:
   an insulator formed at a lower portion of a mount core connected with an engine to insulate vibration by movement according to the vibration;
   a membrane unit disposed under the insulator to separate an upper liquid chamber formed inside the insulator from a lower liquid chamber formed under the upper liquid chamber;
   a contact rib provided at a lower portion of the insulator to be disposed in a state contacting a surface of the membrane unit, and having a contact width contacting the surface of the membrane unit configured to change according to the movement of the insulator; and
   a variable orifice formed at the lower portion of the insulator to enable fluid flow between the upper liquid chamber and the lower liquid chamber, and having a cross-section area configured to change according to the contact width of the contact rib by being disposed adjacent to the contact rib,
   wherein a bending part contacting the surface of the membrane unit in a state bent toward the upper liquid chamber is provided at a lower end portion of the contact rib.

2. The fluid-sealed engine mount of claim 1,
   wherein as the insulator is pressed downward by the engine vibration, the contact width of the contact rib contacting the surface of the membrane unit is increased.

3. The fluid-sealed engine mount of claim 2,
   wherein as the insulator is pulled upward by the engine vibration, the contact width of the contact rib contacting the surface of the membrane unit is reduced.

4. The fluid-sealed engine mount of claim 1,
   wherein the lower portion of the insulator is bonded to an inner circumferential surface of an outer pipe unit that is fixed to a vehicle body through a mount bracket.

5. The fluid-sealed engine mount of claim 4,
   wherein a fixed rib disposed at an outside of the contact rib to surround the variable orifice is provided at the lower portion of the insulator, and the fixed rib is fixed to the inner circumferential surface of the outer pipe unit in a state stacked on the surface of the membrane unit.

6. The fluid-sealed engine mount of claim 1,
   wherein a first fluid flow hole for fluid flow between the upper liquid chamber and the variable orifice is formed at one side of the contact rib.

7. The fluid-sealed engine mount of claim 6,
   wherein a second fluid flow hole for fluid flow between the lower liquid chamber and the variable orifice is provided at one side of the membrane unit.

8. The fluid-sealed engine mount of claim 1,
wherein the variable orifice is formed in an annular shape along a circumferential direction of the insulator, and maintained at a certain length without changing according to the movement of the insulator.

9. The fluid-sealed engine mount of claim 4, wherein the membrane unit is composed of:
a membrane plate press-fitted into the outer pipe unit; and
a membrane disposed at a central portion of the membrane plate to be elastically deformed by a pressure difference between the upper liquid chamber and the lower liquid chamber.

10. The fluid-sealed engine mount of claim 9, wherein the outer pipe unit is composed of:
a first outer pipe provided with a support end formed by stacking the inner circumferential surface contacted with the lower portion of the insulator and an upper surface of the membrane plate; and
a second outer pipe having the first outer pipe and the membrane plate press-fitted therein to be vertically disposed.

11. The fluid-sealed engine mount of claim 1,
wherein the lower liquid chamber is sealed by a diaphragm disposed under the membrane unit.

12. The fluid-sealed engine mount of claim 4,
wherein the mount bracket comprises a casing part to which the outer pipe unit is press-fitted and fixed, and the outer pipe unit enters the casing part until an upper end of the insulator contacts an inner surface of the casing part, and the upper end of the insulator is lowered due to a weight of the engine when the mount core is connected with the engine to be separated from the inner surface of the casing part.

* * * * *